United States Patent [19]

McDonald et al.

[11] 3,958,685
[45] May 25, 1976

[54] COUPLING FOR HANDLING WORKPIECE, CONVEYOR COMBINED THEREWITH, AND METHOD

[75] Inventors: David Ian McDonald; George William Sederberg; Gary David Stephenson; James Gordon Wiatt, all of Cincinnati, Ohio

[73] Assignee: Cincinnati Milacron, Inc., Cincinnati, Ohio

[22] Filed: June 3, 1974

[21] Appl. No.: 475,620

[52] U.S. Cl.................................. 198/179; 118/322; 198/241; 198/257; 214/1 BA; 294/83 AA
[51] Int. Cl.² ........................................ B65G 15/00
[58] Field of Search.................. 198/179, 22 B, 257, 198/261, 241, 242, 243; 294/83 AA; 214/1 BA; 118/322

[56] References Cited
UNITED STATES PATENTS

| | | | |
|---|---|---|---|
| 1,743,018 | 1/1930 | Magnusson et al................. | 198/261 |
| 2,319,474 | 5/1943 | Price.............................. | 198/179 X |
| 3,860,104 | 1/1975 | Strauss............................ | 198/179 X |
| 3,863,753 | 2/1975 | Shank............................. | 198/179 |

*Primary Examiner*—Evon C. Blunk
*Assistant Examiner*—Douglas D. Watts
*Attorney, Agent, or Firm*—Daniel P. Worth

[57] ABSTRACT

A coupling includes a pair of cup-shaped members with one mounted for sliding axial motion inside the other. The outside coupling acts as a support or base which is connected to a conveyor that moves the coupling between workpiece loading and unloading means. The inside member also carries detents which move radially in and out to grasp or release the workpiece in response to axial motion between the two cup-shaped members. When combined with a conveyor, appropriate cam and follower means are provided to cause the coupling to be operated for grasping and releasing the workpiece in a timed sequence and to move the coupling from a workpiece loading station to an unloading station. The coupling and conveyor are suited for use in handling soft or easily marked materials such as plastic, soft metals, and the like. A method for workpiece handling includes steps of rotating, advancing in stop-and-go fashion while continuously rotating, and unloading.

22 Claims, 15 Drawing Figures

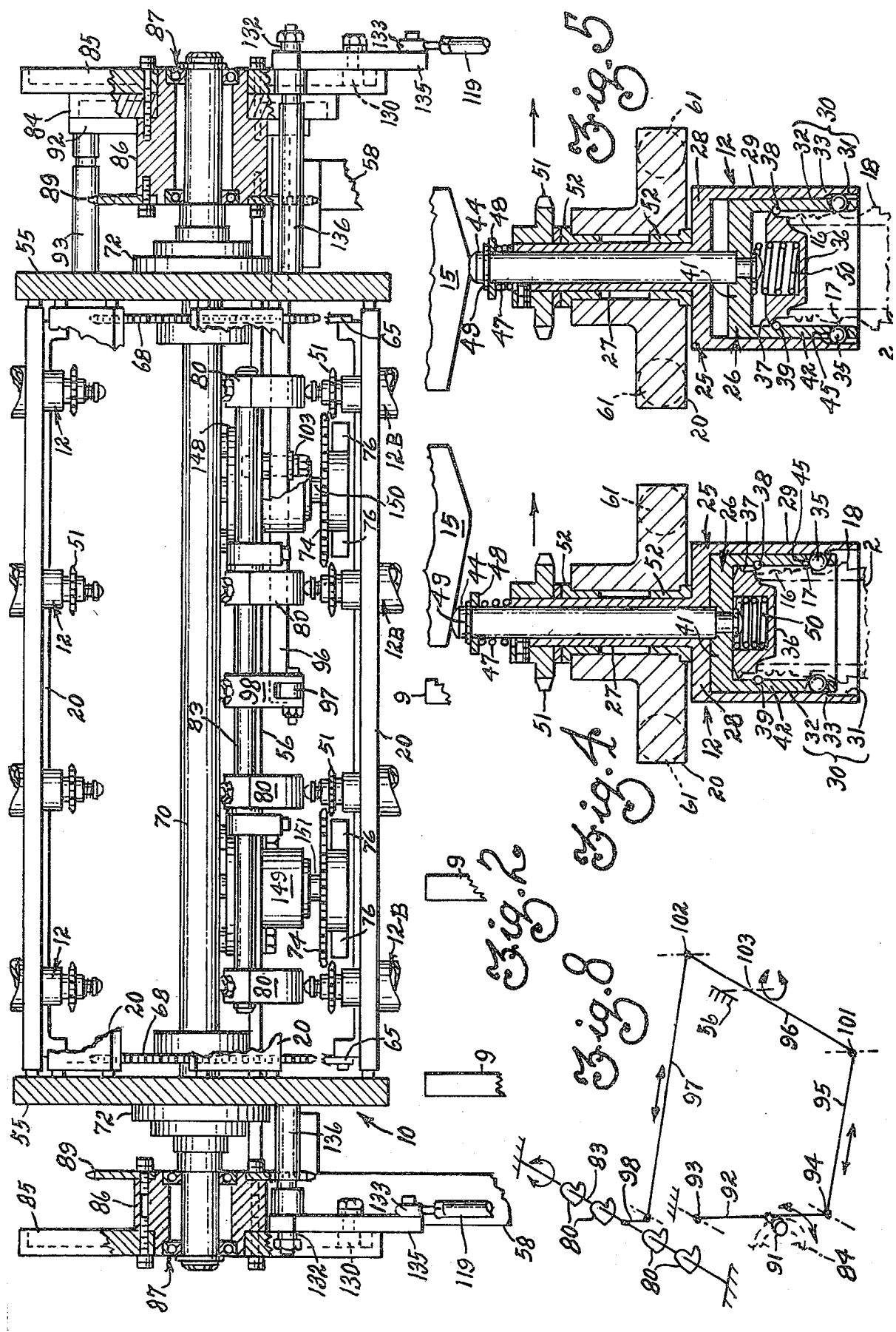

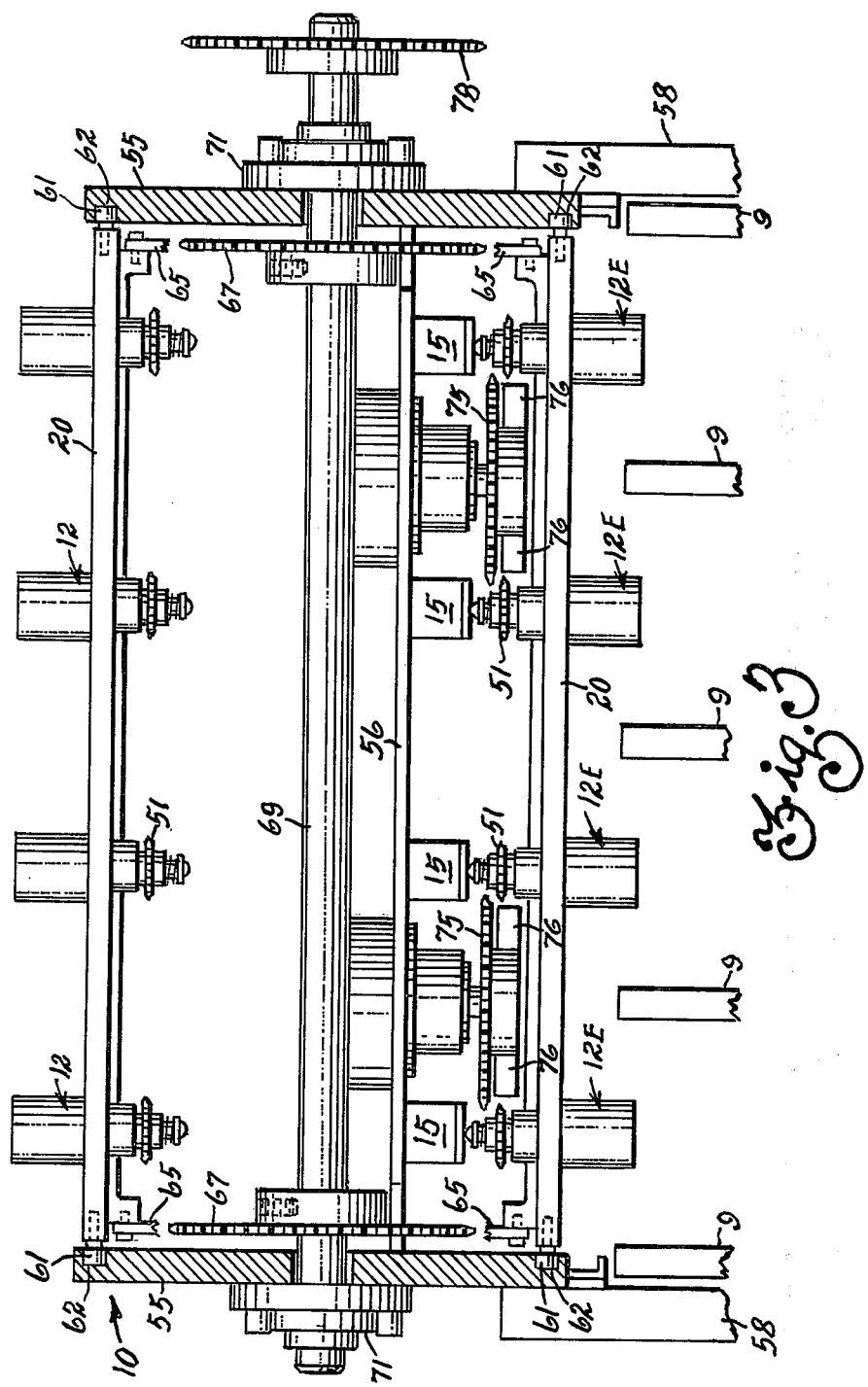

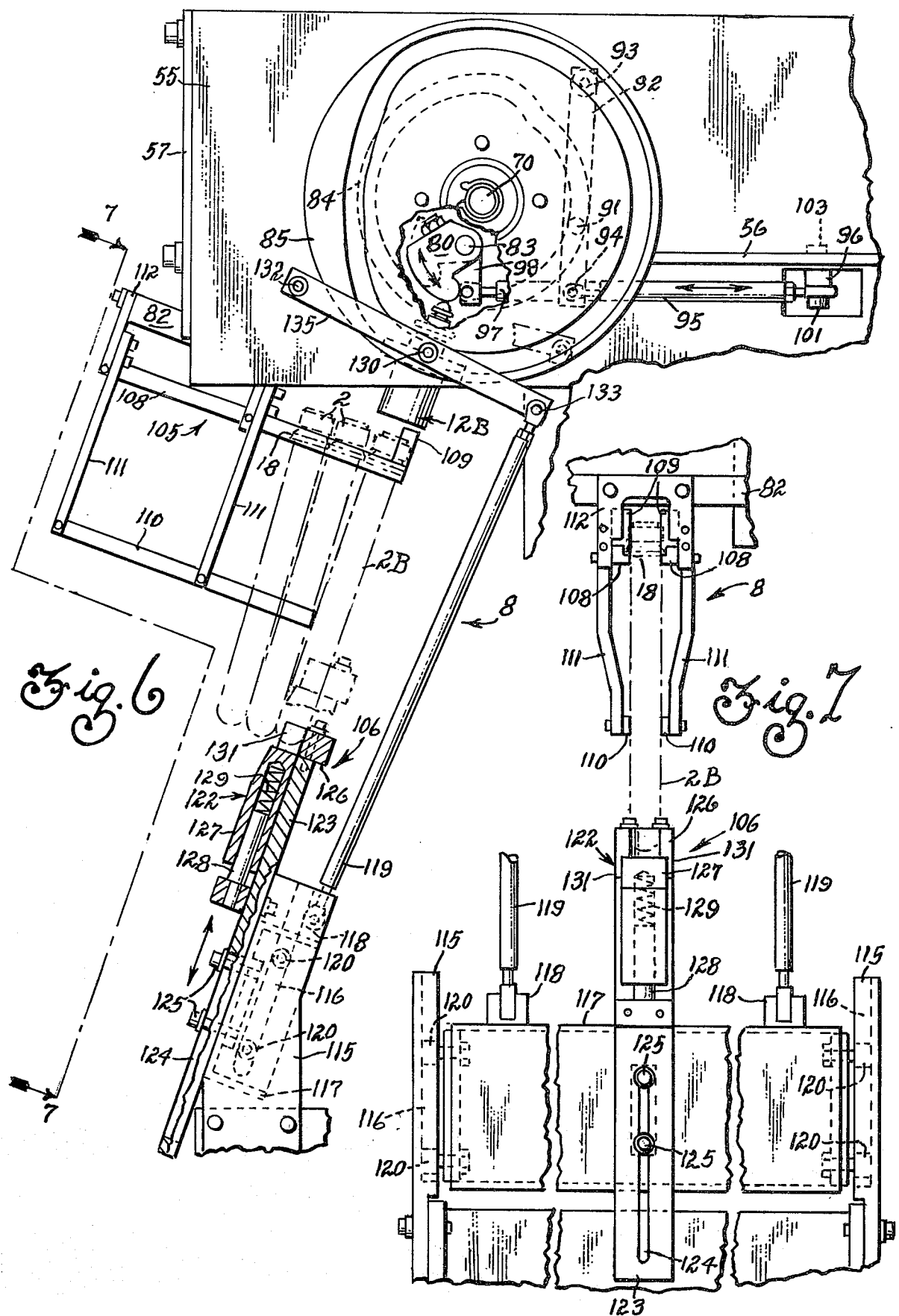

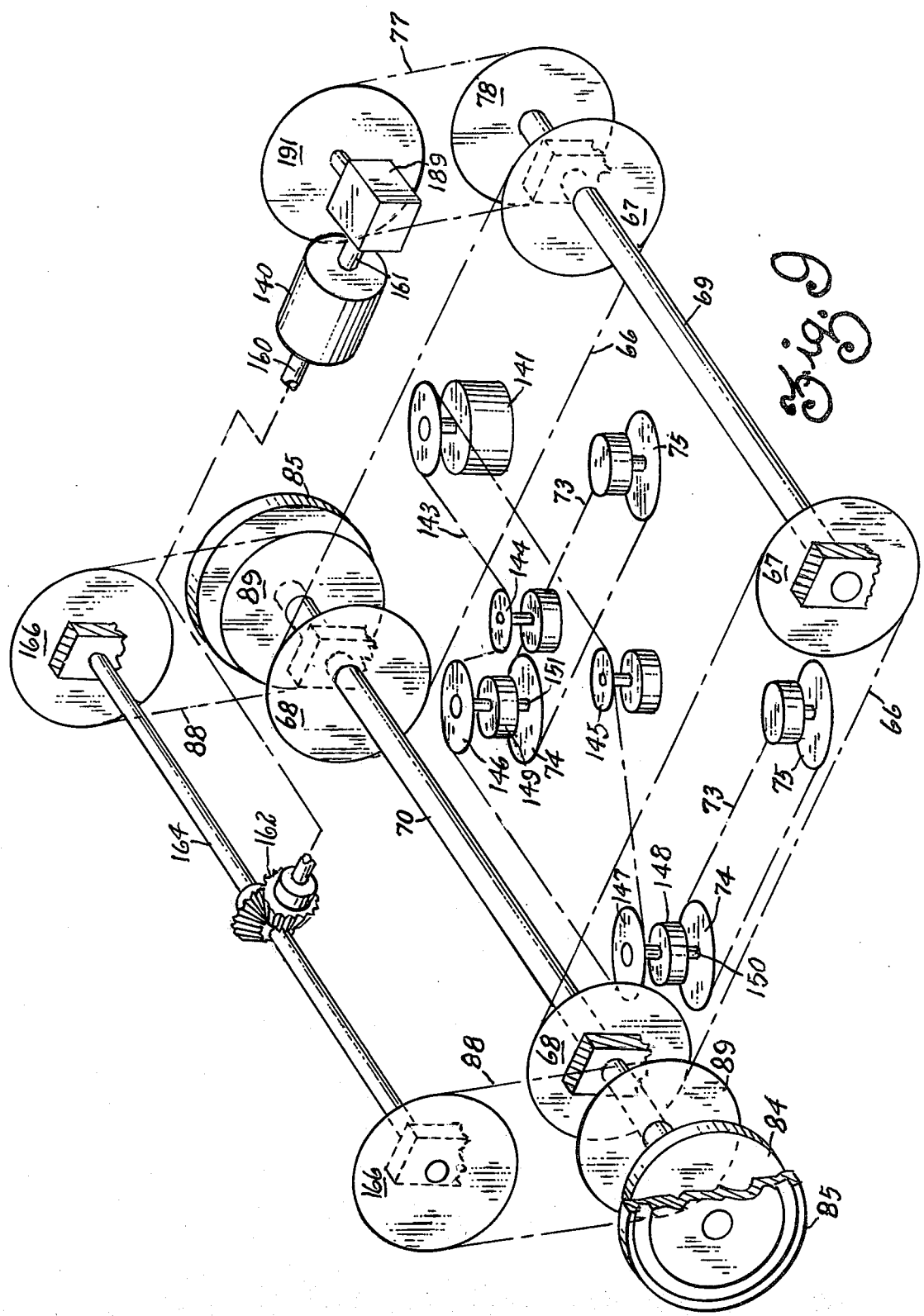

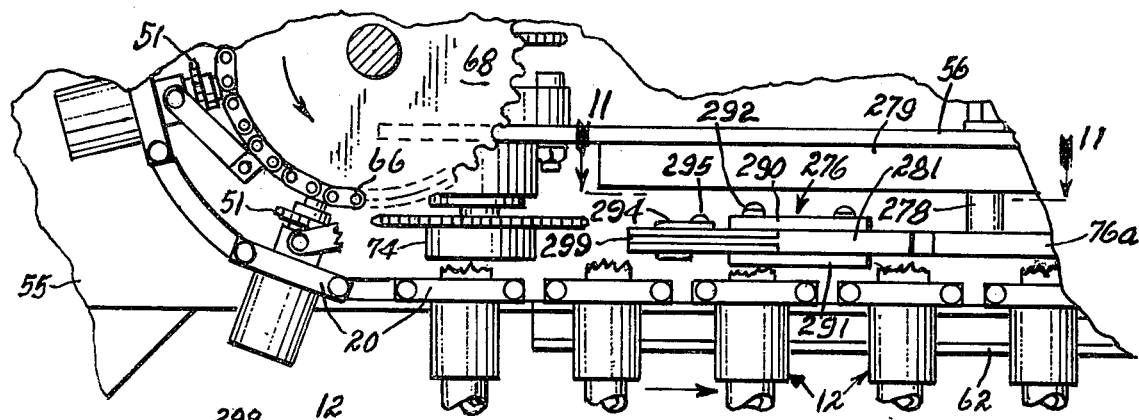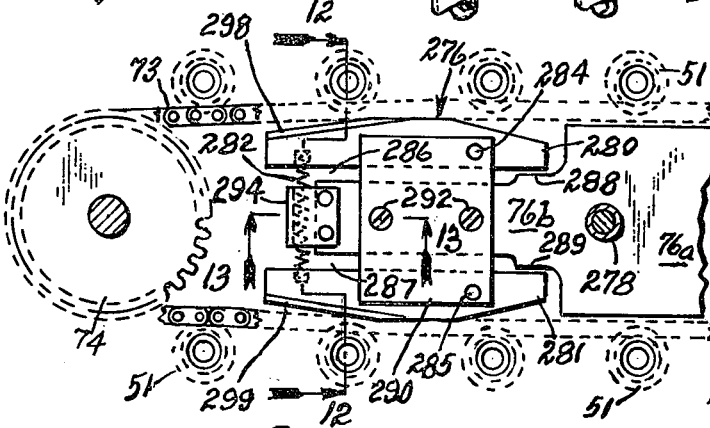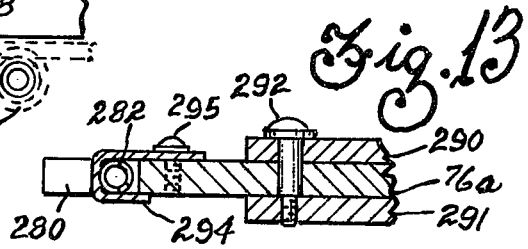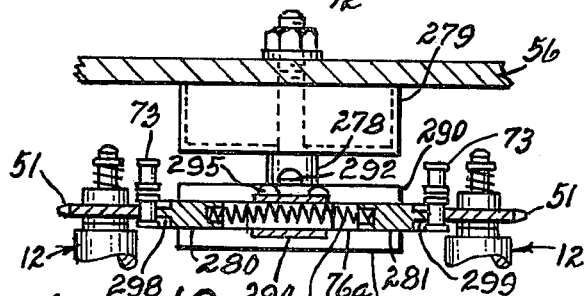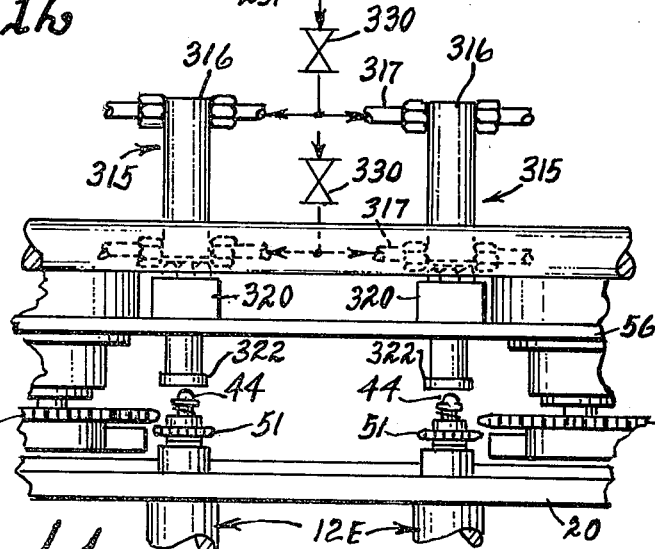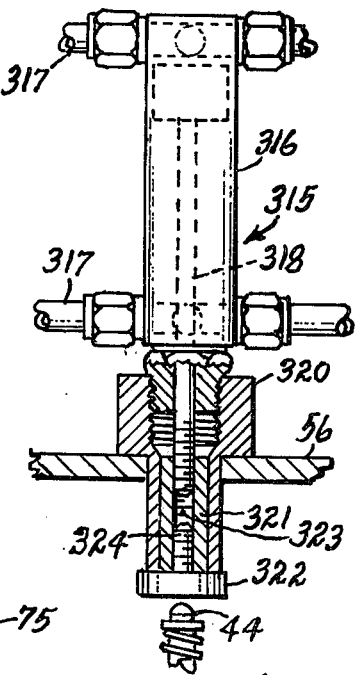

COUPLING FOR HANDLING WORKPIECE, CONVEYOR COMBINED THEREWITH, AND METHOD

SUMMARY AND BACKGROUND OF THE INVENTION

This invention relates to an improved coupling for handling a workpiece and to an improved workpiece transfer means comprising such a coupling combined with a conveyor and to an improved workpiece handling method. One aspect of the invention relates to a coupling having workpiece detent means which move radially to grasp or release, as the case may be, a workpiece. An aspect of the invention relates to a combination of a workpiece coupling with a conveyor for moving the coupling in a timed manner between loading and unloading stations wherein the conveyor means additionally includes actuating means for operating the coupling to cause engagement and release of a workpiece. An aspect of the invention relates to a system for handling an easily marred workpiece such as one of plastic, soft metal, or the like while maintained in a substantially exact position for treatment during transfer.

The invention for purposes of illustration but not limitation will be described in connection with means for handling workpieces comprising injection molded plastic preforms that are being reheated to a carefully controlled temperature immediately prior to being blow molded into a bottle with a threaded neck for closure by a threaded closure. The preform has a circular cross-section and the parts of the coupling engaging the preform likewise have a circular cross-section.

Blow molding has assumed an increasingly important position in the art of manufacturing hollow articles such as containers from various plastics and resins such as polyethylene, polyvinyl chloride, polyacrylonitrile, polyethylene terephthalate and the like. The blow molding art has developed in two major directions depending on the way in which the working material is presented to the mold in which it is blown: extrusion blow molding and injection blow molding. The present invention as already indicated will be explained in connection with injection blow molding.

In injection blow molding, the plastic is first injection molded to make a preform. Where the end product is to be, for example, a bottle with a threaded neck, the injection molding yields the advantages of reducing thermal memory problems and providing a threaded neck which will not change significantly in shape or dimension during further processing.

After the preform has been made by injection molding it is removed to a blow molding operation where it is inserted in the mold, compressed gas such as clean compressed air is used to expand the preform into the shape of the mold and the completed container is recovered. It is often required to carefully regulate the temperature at which the preform is delivered to the blow mold. Temperature regulation is readily accomplished where injection and blowing are done on the same machine, often making use of the heat contained in the preform. Where, however, injection and blowing are done on different machines, a reheating procedure is required.

The present invention is particularly well suited conveying a preform through a reheating operation of the sort just described and delivering the same to a blow molding means. While so doing, it is to be understood that the preforms are passed through an oven where they are heated in a uniform manner. This is accomplished by engaging the preform with the aforesaid coupling, then (by means of the conveyor on which the coupling is mounted) passing it through an oven while continuously rotating the preform in order to heat it uniformly, removing same from the oven and releasing it from the coupling and the conveyor, and thereafter (although it forms no part of this invention) directing the preform into a blow molding system where it then is formed into a container.

Other objects, advantages and features of the invention will become apparent from a reading of the following disclosure in conjunction with the annexed drawings wherein:

FIG. 2 is an end view with partial section along 2—2 of FIG. 1 showing rocking cams for loading the coupling, coupling rotator, face cams for preform (workpiece) timed feeding, and a bearing and sprocket arrangement on a shaft common to both continuous and intermittent rotation;

FIG. 3 is an end view at the release or discharge end of the machine in with partial section along 3—3 of FIG. 1 showing the coupling rotator, release cam, conveyor track and follower, and part of intermittent drive;

FIGS. 4 and 5 are enlarged side cross sections of a coupling on a carrier bar and release cam in, respectively, a workpiece engaging or holding position and a workpiece releasing or loading position.

FIG. 6 is a side view from the right hand side in partial section of the loading end of the conveyor of FIGS. 1 and 2 with the side plate on and with other details omitted for clarity showing a workpiece loading means for presenting workpieces one at a time to each coupling;

FIG. 7 is an end view along 7—7 of FIG. 6 of one of several workpiece loading means it being understood the other such means are constructed in like manner;

Figure 1:
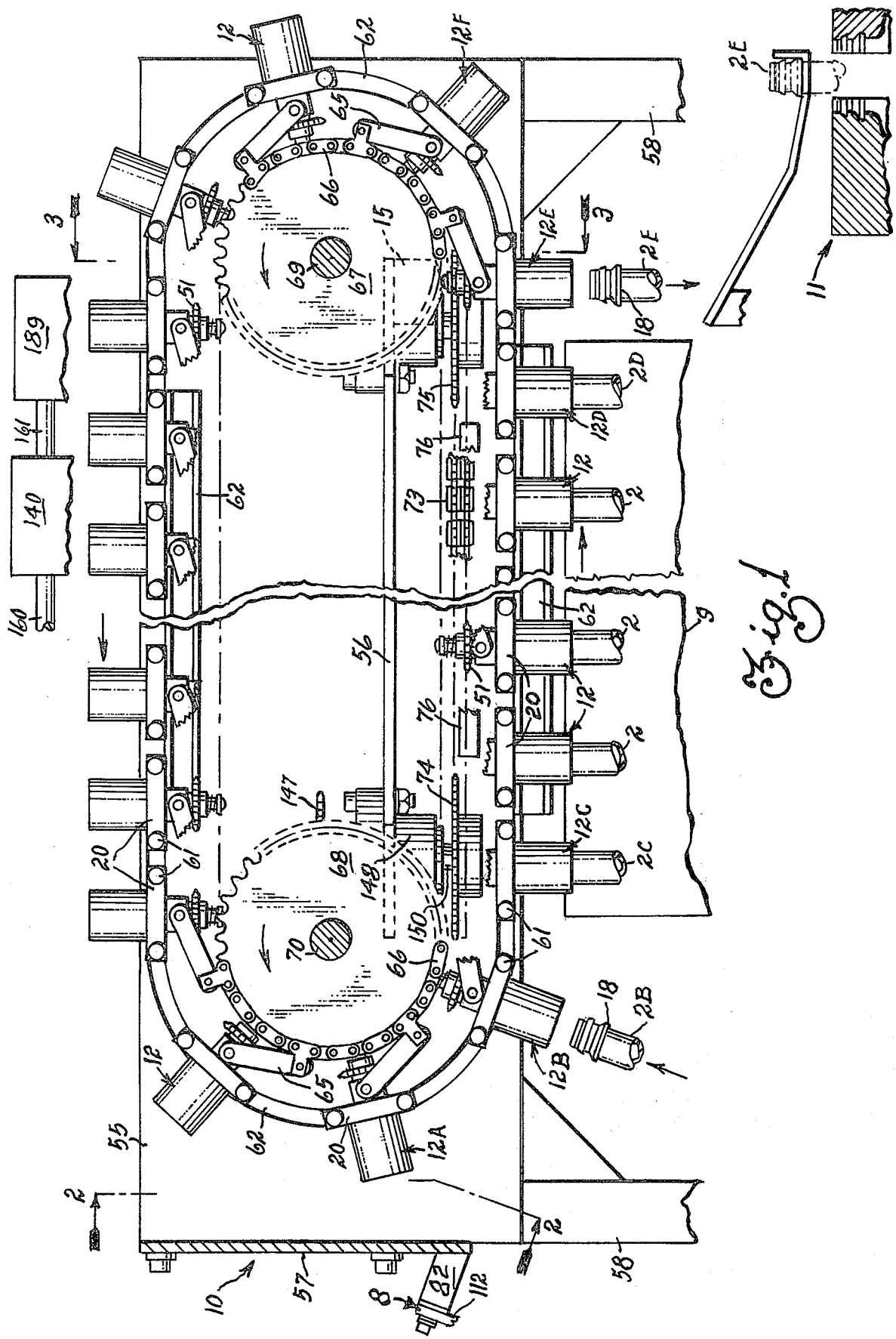
FIG. 1 is a side view with side plate removed and in partial section showing a conveyor combined with plurality of couplings and with workpieces e.g. preforms, engaged by couplings.

FIGS. 8 and 9 are isometric schematic diagrams, respectively, of the linkage that operates the rocker cam of FIG. 2 and of the conveyor power trains one of which provides both continuous and intermittant motion; and FIGS. 10, 11, 12 and 13 respectively, are side, top, and enlarged end and side views in partial section of a modified preferred embodiment of the pressure plate for the lower half of the coupling drive chain; and FIGS. 14 and 15, respectively, are end and enlarged side views in partial section of a modified preferred embodiment of the release cam means.

GENERAL

For purpose of illustration, a preferred embodiment of the invention will be described which is useful for conveying preforms 2 of polyethylene teraphthalate shaped as shown in FIGS. 4, 5 and 6 from the loading means 8 of FIGS. 6 and 7 through an oven 9 while heating the same to a predetermined condition (FIGS. 1, 2 and 3) using the conveyor 10 of FIGS. 1, 2 and 3 and then to release the preform by appropriate means (FIGS. 3 and 5) for direction to a blow molding means 11 of any conventional type. Inasmuch as the oven and blow molding means are not part of this invention, no further description of either will be given. The workpiece 2 is held or engaged by a coupling 12 constructed as in FIGS. 4 and 5 from the time it is loaded by the loading assembly of FIGS. 6 and 7 until it is released at the other end of the conveyor by release cam means 15 further described with respect to FIGS. 3 and 5. The coupling is continuously rotated during the time it passes through the oven 9 to achieve a uniform application of intense heat, hence a uniform temperature. The conveyor itself has an array of couplings 12 and alternately advances and stops (i.e. stop and go advancement) the couplings periodically so that loading by the assembly 8 (FIGS. 6, 7) takes place during those times the couplings 12 are not advancing even though some of them may be rotating.

The workpiece being handled preferably has a shaped portion contoured for engagement and most preferably has a head on top of a long body so that the coupling detents can engage and hold under the head: for present purposes it is assumed to be a preform of soft plastic material shaped generally like a test tube with a threaded lip 16 (FIGS. 4, 5, 6) for use in blowing a bottle. Such a preform due to, inter alia, the extreme stresses to which it will be subjected during blowing, filling, and capping has a neck construction comprising an externally threaded lip 16 superimposed immediately above a pilfer proof ring 17, which is spaced closely above a support ring 18. The pilfer proof ring and threads are of course used in connection with filling and capping the ultimate container. The preform and the bottle made from the preform is hung from the support ring 18 during many manufacturing operations, in the manner shown in FIGS. 6 and 7, for example.

Injection molded preforms are loaded by hand or by some appropriate loading device into the loading assembly 8 of FIGS. 6 and 7 which is connected to the left end of the FIG. 1 conveyor. This loading assembly is operated in timed relationship to the movement of the conveyor 10 and of each individual coupling 12 whereby each preform is fed to the coupling while the latter is temporarily held in the load position (reference 12B) in FIGS. 1 and 6. The coupling parts are during loading held in the open (release) position of FIG. 5 until the workpiece is seated after which the coupling is closed, i.e. moved to the engaged or holding position of FIG. 4. Once the workpiece or preform has been thus loaded in the coupling 12B the conveyor once again resumes its advance whereupon each loaded coupling (e.g. 12C–12D) is continuously rotated while being moved from position to position in a periodic fashion through the oven and to the point of release 12E shown at the right side of FIG. 1 and in FIGS. 3 and 5.

As should be apparent from viewing the drawings, especially FIGS. 1–3, an array of couplings is presented in a rank and file fashion. The illustrated embodiment (FIGS. 2, 3) shows a plurality of couplings ranked four abreast on a carrier bar 20 whereby these four are able to move in unison through all operations to simultaneously deliver four preforms to the blow mold 11. Also, as shown best in FIG. 1, the couplings are likewise arranged in a file fashion, that is, one behind the other, so that the loaded couplings are able to move under the motive power supplied by the conveyor from the loading station 8 through the oven 9 to the release point 12E (adjacent a chute to blow molds 11 which is illustrated without the usual vertical spacing due to space limitations) and the empty couplings then return to the loading station and so forth repeatedly.

The conveyor 10 provides appropriate means for causing the continuous rotation of each loaded coupling while at the same time providing for intermittent advancement of the coupling from the loading to the unloading ends of the machine.

COUPLING

The preferred embodiment of coupling 12 to be used in the present invention is illustrated in cross section in FIGS. 4 and 5. FIG. 4 illustrates the position of the various coupling parts when a preform or other workpiece is engaged or held by the coupling or when the coupling is empty and being returned for reloading. FIG. 5 illustrates the relative position of the parts when the coupling is releasing or receiving a workpiece.

The coupling 12 engages and releases the preform responsive to relative motion between its several parts, which motion converts axial to radial motion. The coupling comprises first and second cup-shaped members 25, 26. The first cup-shaped member 25 is the outermost member and forms a support member the upper portion of which is revolvably secured to the conveyor and which includes; a closed end 28 from which a hollow stem arises and a tubular, preferably cylindrical wall 29. The wall of the first member 25 also has a cam surface 30 on the lower inside of its lip or skirt which surface is divided into two parts, the lowermost being a release cam surface 31 and the uppermost being a holding or workpiece engaging cam surface 32. A rise 33 of any convenient slope connects the two. The wall 31–32 also may serve as a heat shield to prevent heating of the injection molded neck and threads 16, 17, 18 on the preform: thus preserving the molded shape with minimal distortion due to thermal memory problems.

A plurality of detents 35 which are preferably spherical bodies such as ball bearings is carried by the second cup-shaped member (or carrier). The detents are the elements that physically engage the preform. In the preferred embodiment, the slope on the underside of the preform anti-pilfering ring 17 is such that inward radial motion of the detent wedges the detent thereunder to drive the upper end or lip of the preform firmly against the preform seat 36 which is retained in the upper end of the carrier by seat flange 37 engaging a retaining ring 38 seated in a groove 39.

The second member 26 is supported for axial movement within the first or support member and has an end wall 41 and tubular wall 42 to hold the detents 35 acting as a carrier for them so that detents can move radially when the carrier 26 is moved axially in amounts sufficient to move the detents 35 from the holding cam surface 32 as in FIG. 4 to the release cam surface 31 as in FIG. 5 and vice versa.

The detent carrier 26 has a closed end 41 from which rises a follower 44 and from which depend the tubular preferably cylindrical wall having a plurality of apertures 45 completely therethrough. Preferably three apertures are used whereby three detents 35 may be employed. Apertures 45 actually are tapered holes which diverge outwardly from the central part of the housing. The balls 35 comprising the detents are therefore retained in these tapered holes but are able to protrude therefrom enough to firmly engage the workpiece as illustrated in FIG. 4.

The follower 44 is connected to the carrier, is slidably supported in and passes through the hollow stem 27, and extends beyond the stem (see FIGS. 4 and 5) by an amount sufficient to engage an actuating means such as the several cams (see rocker cam infra and release cam 15) illustrated in FIGS. 2, 4 and 6 and described below with reference to the loading and unloading means. A resilient biasing means 47 is comprised of a helical holding spring compressed between the support stem 27 and the housing follower 44, being retained thereon by a retaining ring and washer 48, 49 and biasing the detent carrier to within the support member, i.e. biasing the parts into the relative positions shown in FIG. 4.

A second resilient biasing means is provided as seat spring 50 between the closed end 41 of the detent carrier and the workpiece seat 36. The seat spring is in compression and biases the carrier and seat apart.

There is also secured to the upper end of the hollow support stem, a sprocket or gear 51 for causing the coupling to rotate continuously about an axis through the coupling when combined with the conveyor. The support stem 27 is mounted revolvably to the carrier bar 20 by a pair of journal bearings 52 which preferably comprise permanently lubricated bushing type insert bearings which are readily obtainable commercial items.

Each coupling 12 operates thus: (See FIGS. 4, 5) the workpiece 2 is initially loaded in or is released by depressing the follower 44 which compresses the holding spring 47 and moves the carrier 26 axially down toward the FIG. 5 position whereupon the ejection assisting means of the seat 36 and spring 50 operates so that the seat spring 50 urges the seat 36 down to where the retainer 38 stops further seat movement: responsive to these actions the detents 35 are radially moved back into their apertures 45 against the release cam surface 31 thereby releasing the workpiece. The parts at this time reach the FIG. 5 position and if a workpiece is in the coupling at beginning, it is released but if the coupling is empty it is loaded by inserting a workpiece 2 and moving it axially until the detents 35 engage it by ultimately assuming the FIG. 4 position. The holding function proceeds in substantially the reverse order of the steps first recited and the detents 35 upon rising to the holding cam surface 32 become fully engaged with the preform. Thus, relative axial motion between the two cup-shaped members 25, 26 is converted into radial motion of the detents 35.

CONVEYOR ASSEMBLY

The conveyor assembly 10 provides the machine frame or base on which the entire system is mounted. The base includes a pair of conveyor side plates 55 (FIGS. 1, 2 and 3) spaced apart by a horizontal frame plate 56 and connected at one end by a vertical end plate 57 and mounted on legs 58 a suitable height above the floor. The various frame members constitute a support assembly from which a variety of bearings, prime movers, and guide members are supported.

The couplings 12 are arranged four abreast across the conveyor in the carrier bar. Each carrier bar 20 is supported at each end by a pair of rollers 61 — conveniently cam follower rollers — from a side frame track 62 which advantageously may comprise a groove machined in the side plates. It is preferred to reduce machining, however, so it may be an advantage to bolt angle or channel irons to the side plate for use as carrier bar track in the horizontal straight portions and to only machine a semi-circular groove therefor at the ends (as viewed in FIG. 1) of the respective side plates.

Each carrier bar 20 is connected by a drag link 65 at each end to a conveyor chain 66 on each side of the conveyor. The conveyor chain in turn is wound around the drive and idler sprockets 67, 68 which are respectively mounted on drive shaft 69 and idler shaft 70. The drive shaft 69 is supported between the side plates 55 (FIG. 3) on bearings 71. The idler shaft 70 is supported in bearings 72 from the respective side plates. Note that each end of each carrier bar 20 is supported on a track 62 and has a drag link 65. Among other things this eliminates malfunctions from the carrier bar cocking as might be the case were they single point connection.

The couplings 12 are caused to rotate continuously by a horizontally disposed double width or double link chain 73, the lower half of which engages the coupling sprockets 51 and the upper half of which is wound around a coupling drive sprocket 74 and coupling idler sprocket 75. The use of the double width chain 73 and placing the coupling sprocket 74 at a vertically lower level or plane than the drive and idler sprockets eliminates mechanical interference that might occur if they were at the same level while at the same time permitting each coupling to begin rotation earlier and end it later in its course of travel from the loading to the unloading stations. A pressure plate 76 (a modified embodiment of which that is preferred being described relative to FIGS. 10-13) is supported to engage the backside of both the tight and slack side of the chain 73 to assure maintenance of driving contact between the chain 73 and the respective coupling sprockets 51. As best seen in FIGS. 2 and 3, both the tight and slack sides of each chain are engaged by a plurality of sprocket couplings. Moreover, by placing the coupling chains 73, their drive gear 74, 75 and pressure plates 76 between each pair of coupling files, a minimum number of coupling drive systems have to be used.

The Power Train described below and seen in FIG. 9 intermittently rotates the conveyor drive sprocket shaft 69 by delivering intermittent periodic power pulses through chain 77 (FIG. 9) to the conveyor main sprocket 78. The coupling rotary system 73, 74, 75 is continuously driven by a separate but continuously operating drive train further described in FIG. 9, which delivers power to the coupling drive and idler sprockets.

WORKPIECES LOADING AND UNLOADING MEANS

Workpiece (preforms) are fed into and removed from the coupling by means which cooperate with cams 80 and 15 (or 315, FIGS. 14 and 15) respectively to move the various parts of each coupling in a timed manner between the FIGS. 4 and 5 positions thereby to load and unload the coupling. The cycle of coupling positions for workpiece loading, conveying, and unloading is: (a) cam the coupling 12B (FIG. 1) to the release/load position of FIG. 5; (b) while in the FIG. 5 position and using the loading means 8 (left side FIG. 1; FIG. 6) feed the workpiece 2 into the coupling until the seat 36 is pushed against the closed end 41 of the carrier; (c) at which time cam the coupling to the engage/hold position of FIG. 4; advance the coupling to the unload station 12E while keeping it in the FIG. 4 position; (d) release the workpiece at the unload station 12E by moving the coupling to the FIG. 5 position; and then (e) return the coupling to the FIG. 4 position and move the coupling to the loading station.

The unload/release structure and operation being the simpler of the two will be explained first and by reference to FIGS. 1, 3, 4, 5. The unload station 12E is at the right end of the conveyor in FIG. 1 and is reached when a coupling is moved to the position of coupling 12E at which position the coupling follower initiates contact with the release cam 15 as shown in FIG. 4. The release cam 15 is bolted or otherwise fixed to the horizontal frame plate 56 but is phantomed in FIG. 1 to avoid a cluttered drawing: See FIGS. 3–5. Rightward movement of the coupling 12E is interrupted and it dwells at 12E for a time interval sufficient for loading a preform 2B into the coupling 12B at the other end of the machine. The next advance of the coupling moves the follower 44 along the release cam 15 until the cam release point is reached as seen in FIG. 5 which releases the preform 2E. The coupling continues to move during this advance until it is no longer in contact with the release cam and in fact moves to the position of coupling 12F of FIG. 1: this continued advance allows the follower to move past the release cam 15 trailing edge and out of all contact with the release cam whereupon the follower spring 47 returns the now-empty coupling parts to the position illustrated in FIG. 4 — except 36 is down on ring 38 — for the coupling. The coupling parts remain in this hold/engage position until the coupling reaches the loading station at coupling 12B.

The conveyor chain 66 moves the coupling around the right end of the conveyor of FIG. 1 and along the horizontal track 62 at the top of the conveyor to ultimately move around the left end of the conveyor (as seen in FIG. 1) to the loading position designated as coupling 12B. Bracket 82 fixes the loading means 8 to the frame end plate 57. At the loading station or position, mechanisms shown in FIGS. 2, 6, 7 and 8 are used to manipulate the coupling, place a workpiece therein, and to engage and hold the workpiece.

As the coupling moves from position 12A to 12B (its parts in the hold/engage posture of FIG. 4) on its carrier bar around the left end of FIG. 1, the follower engages the rocker cam 80 shown in the partially cut away part of FIG. 6 and the coupling movement is interrupted when the coupling reaches position 12B. The rocker cam 80 has by this time depressed the follower so that the coupling parts assume the load posture of FIG. 5.

The conveyor system in FIG. 1 is driven intermittently so that the coupling is held still (hence all couplings are held still temporarily) at the loading position 12B of FIGS. 1 and 6 for a time sufficient to load a workpiece 2B theren. As soon as the preform (workpiece) is fed into the coupling, the rocker cam 80 is oscillated clockwise to free itself of contact with the follower 44 which allows the coupling to spring back to the hold (FIG. 4) position, which means the detents grab the preform.

The rocker cam is mounted on a rocker shaft 83 (as are a plurality of like cams) and is manipulated by the linkage illustrated in FIG. 8 (and see FIGS. 2, 6) which operates off a face cam 84 which is bolted as a matter of convenience to the back face of one of a pair of feeder face cams 85, 85 and is mounted to rotate in unison therewith on the housing 86 of ball bearing assembly 87 on shaft 70. All of the face cams 84, 85 are driven by power received from chains 88 at sprockets 89 which latter are likewise bolted or otherwise fixedly secured to their respective ball bearing assemblies 87 and which in turn receive their motive power through the continuous drive train further illustrated in FIG. 9.

Anyhow, the rocker face cam 84 is engaged by a follower 91 (FIGS. 6, 8) located intermediate of the ends of the follower arm 92 one end of which is mounted to pivot from the frame about 93 and has a clevis connection 94 at the other end to a horizontal linkage 95, 96, 97 (FIG. 8) which transmits and amplifies the motion of the cam follower 91 to the crank 98 of the rocker cam shaft 83 in such fashion that the rocker cam 80 is moved out of contact with the coupling to permit the coupling to assume the FIG. 4 position after which the rocker cam 80 is returned to a position where it can depress the coupling follower of the next succeeding coupling.

The FIG. 8 linkage (also FIGS. 2, 6, 7) includes first and second push rods 95, 97 which are connected by conventional pin or clevis joints 101, 102 to a horizontal lever 96 that is pivotally supported by bearing 103 from the horizontal frame plate. The cam and entire FIG. 8 linkage are shaped to hold the rocker cam in the FIG. 6 solid line position for a time sufficient to allow loading of a preform into the coupling (by holding the latter in the FIG. 5 position as noted above) then to snap the coupling to the hold position of FIG. 4 by rocking the cam clockwise out of contact with the coupling follower to the position shown in FIG. 6 ghost lines after which the rocker cam is held in the out of contact position until after the conveyor 10 has moved the coupling away from position 12B. The rocker cam is then rocked back to the contact solid line position. The next periodic motion of the conveyor means moves the coupling from the loading position, replaces it with another, and preferably brings each coupling to approximately the position 12C where it initially engages the double width chain and starts rotating.

The loading means 8 of FIGS. 6 and 7 is a loader face cam 85 operated feeding means for feeding one workpiece at a time from the loading chute 105 into couplings presented one by one at the loading position designated as coupling 12B, (actually four into four when the four abreast array of FIGS. 1–3 is used) in a predetermined time relationship with the conveyor operation. Thus the machine includes a timing system (the face cams 84, 85 and the conveyor intermittant drive 189 of FIG. 9 infra) that operates the feeding means which the conveyor i.e. the several couplings is/are held still. As best seen in FIG. 2, there is one face cam on each end of shaft 70 and the ball bearing assemblies 86, 87 permits relative rotary motion between the shaft 70 and each face cam unit 84–87 or 85–87. The loader face cams are shaped to cooperate with the rocker cam by feeding a preform into the coupling and holding the preform there until after the rocker cam 80 has been moved to cause the coupling at 12B to grasp or hold the workpiece and then to return the feed means to the FIG. 6 solid line or starting position until the next succeeding coupling is presented at position 12B.

A support bracket 82 (FIGS. 1, 6) holds the loading means 8 in place. The means 8 causes the preforms to be gravity fed by chute 108 to the position designated as preform 2B from whence it is axially moved by a filter assembly 106 into the coupling as aforesaid.

The loading chute of FIGS. 6 and 7 comprises a sloping pair of upper tracks 108 which the support ring 18 of the preform engages and stop 109 on the end of track to exactly position the preform relative to the coupling. Lateral positioning of the preform is maintained by a pair of lower tracks 110 which engage the preform or workpiece at any convenient location intermediate of the ends of the workpiece. The upper and lower tracks are supported by vertical bracket arms 11 which are bolted or otherwise secured to the workpiece support brackets 82 and bracket plate 112. (FIGS. 1 and 6).

The lifter assembly 106 (FIGS. 6, 7) comprises side support members 115 containing straight internal guide tracks 116, a cross bar 117 pivotally connected by clevis joints 118 near each to one of the follower rods 119 depending from one of the feeder face cams 85, and a plurality of rollers 120 at each end that support the bar from the guide plates. A plurality of individual resilient workpiece feeder assemblies 122 is mounted on the bar, one for each file of couplings. (Only one such feeder assembly will be described the remainder being identical therewith). Each feeder has a base plate 123 secured to the cross bar 117 by a plurality of bolts 125. The slot 124 allows adjusting same to accomodate different lengths of preforms or workpieces. On the outboard end of this support is secured a cap 126 which is shaped like a U or channel to receive the end of the workpiece in the manner illustrated in FIGS. 6 and 7 to be capable of engaging and positioning the forward and lateral surfaces of the workpiece.

A foot 127 is slidably supported on a peg 128 and is resiliently biased away from the peg by a spring 129 so that preforms of slightly different lengths can still be fed and firmly positioned within the coupling. Ears 131 on the cap provide lateral and axial support and stops to the foot 127.

Each feeder face cam 85 is engaged by a follower 130 positioned centrally in a follower arm 135 which pivots about a fixed pivot 132 and has a free or swinging end 133 which pivotally connects a follower rod 110 which as shown in FIGS. 6 and 7 is connected to the cross bar 117. A spacer 136 supports the pivot 132 a suitable distance from side frame 55. The face cams 85 are shaped to lift the preform and feed it axially into the coupling, dwell there until the rocker cam has moved the coupling to its hold position of FIG. 4, and then retract and repeat in timed relation to other events and while the coupling is stopped at 12B.

POWER TRAIN

FIG. 9 shows a preferred power train for the instant invention. Two prime movers in the form of electric motors 140, 141 are provided. Motor 141 drives a horizontal chain 143 which is lead around a number of idlers 144, 145 and is used to drive the coupling rotating primary gears 146, 147 which are supported by bearings 148, 149 from plate 56 on the same shafts 150, 151 which support sprockets 74.

Motor 140 is actually a gear motor and uses both ends of one output shaft or two output shafts 160, 161 so that the drive train is divided into two parts, a continuously rotating system off shaft 60 and stop-and-go or intermittant preform advance drive off 161. The gear motor 140 is mounted preferably on top of the conveyor system as schematically illustrated in FIG. 1. Its continuous drive system is taken off shaft 160 and connected by line shafting, bevel gears 162, timing shaft 164, timing sprockets 166, timing chain 88, and sprockets 89 to drive continuously the loading system face cams 84, 85.

The intermittant drive system passes through an indexing means such as a magnetic clutch or geneva wheel 189 to a sprocket 191 that drives chain 77 that drives the main sprocket 78 and shaft 69 to thereby intermittently advance the conveyor system 10 and therefore the carrier bars 20 and couplings 12.

During operation of the system both motors 140, 141 operate continuously. The system driven by motor 140 operates as above described. The system driven by motor 141 operates continuously to thereby continuously rotate the couplings hence to continuously rotate the preforms.

METHOD OF LOADING, CONVEYING, AND UNLOADING

The method of loading a workpiece 2B into a coupling 12B, conveying it along a path to an unloading station 12E and there releasing it comprises the steps of providing a coupling 12 for holding the workpiece 2 which comprises a generally cup-shaped support member 25 revolvably mounted on a linearly movable conveyor means 20, a cup-shaped carrier member 26 slidably mounted for axial movement within said support member and detent means 35 carried by said carrier and operable to move radially responsive to relative axial motions between said carier and support members; moving the coupling to and arresting motion at a loading station 2B; feeding a workpiece 2B axially thereof into the coupling; moving the detents 35 radially inward to grasp the workpiece responsive to the aforesaid axial motion; conveying said coupling and workpice by intermittent periodic increments of advancement toward the unloading station 12E; and releasing said workpiece by causing said detents to move radially away from said workpiece responsive to movement to the unloading station. The invention also includes the combination of this method and the step of continuously rotating the coupling during a major portion of the time the coupling with workpiece therein is being intermittently advanced from the loading station 12B toward unloading station 12E. The method can also embrace using a plurality of equally spaced couplings 12 in an array of couplings arranged in rank and file manner (note FIGS. 1–3) whereby a plurality of said couplings may be simultaneously loaded (in the manner described for FIGS. 6, 7) and unloaded.

MODIFIED PRESSURE PLATE

FIGS. 10, 11, 12 and 13 show a preferred version of the pressure plate which is characterized by having a modified pressure plate 76a with a spring loaded nose assembly 276 which provides a smooth entrance or lead-in section for getting the teeth on the coupling sprockets 51 engaged with the lower links on chains 73. Advantages of this construction include significant reduction in breakage and other malfunctions of chain 73 under operating conditions: such breakages occur from sprocket teeth jamming on the chain rollers.

As with the original pressure plate 76, the nose assembly 276 can be and preferably is suspended by lugs 278 from channel iron 279. The channel is secured by appropriate means such as bolts or welding (not shown) to the horizontal plate 56 and the lugs are in turn secured by bolts (not shown) or by welding.

Nose assembly 276 essentially is a pair of spring loaded chain leads 280, 281 which are mounted on a modified end 76b of the modified pressure plate 76a, within one of the endless loops comprising chain 73 with the leads in each pair supported to engage the rollers but not the links on the chain 73. A spring 282 biases the leads outwardly against the chain. Each lead is pivoted about its respective axis (preferably a bolt) 284, 285.

The pressure plate end 76b is cut to a certain configuration to allow (FIG. 11) clearances 286, 287 which permit inward motion of each lead and to limit by lugs 288, 289 the outward motion of each lead about said axis.

The chain leads are actually mounted between upper and lower mounting plates 290, 291 which are secured by bolts 292 or other means to the end 76b and in which the bolts 284, 285 are mounted.

The spring 282 is held in compression between the leads, thereby urging them outward but permitting resilient resistance to inward motion which may occur in random fashion when the sprocket teeth, chain rollers, and lead are mutually engaging each other. The spring is held in place by a sheet metal clip 294 having a J-shaped cross section which is secured by screws 295 to the end 76b.

As best seen in FIG. 12 leads 280, 281 are respectively (and each) provided with an outer engaging bead 298, 299 that is narrow enough to easily fit between the lengths of chain 73 thereby to insure that only the chain rollers and not the side links are engaged by the entrance or leading edge of each chain lead. The main body of each chain lead may be made substantially thicker than the roller of the chain, thereby providing strength and adequate bearing surface at its axis 284 or 285. However, the entrance beads 298, 299 may be formed as by milling or grinding to a thickness less than the roller would thereby to insure engagement only of the rollers and not of the side links. As see in FIG. 11 this entrance bead is tapered so that by the time the chain roller and coupling sprockets reaches it widest point a smooth engagement of the chain and sprocket have been achieved. The bead can optionally be continued on the pressure plate main body 76a.

PNEUMATIC RELEASE CAM ASSEMBLY 315

FIGS. 14 and 15 show this feature which in essence provides a pneumatic air cylinder 316 to release each workpiece that the coupling brings to station 2E, 12E. Speaking generally, when the presence of the stopped workpiece at station 2E is detected (through a suitable means contact switch, photocell operation etc.) air is admitted through a control valve 330 into air line 317 thence into cylinder 316, thereby extending the plunger 318 which protrudes therefrom which in turn strikes the follower 44 on the coupling 12E and drives the same down at least until the detents release the workpiece 2E.

The air cylinder 316 and associated structure of assembly 315 fit completely and in place of each of the cams 15 previously described. These air cylinders are preferred because all four of them can be operated at once with a stroke long enough as to each file of couplings regardless of minor difference in mechanical stroke, alignment, etc. to insure thereby releasing four preforms simultaneously. The simultaneous release is immportant because all have to blow molded simultaneously on a very rapid cycle.

The release assembly 31 compensates for differences in stroke required and in lateral or cross machine alignment as the couplings and workpieces. Machine wear resulting in chain stretch, thermal warpage, wear on coupling parts, etc. render the pneumatic cylinder version of FIGS. 1 and 3–5 preferable although operating experience to date indicates that the release cam 15 serves for a considerable period of time before requiring realignment of the various machine parts or the adoption of a different means to achieve simultaneous release.

Each cylinder 316 is provided with a suitable manifold 317 including an air (or other compressed gas) line. Preferably, this is compressed air. Air admission and cut off is controlled by a valve 330 in each manifold. It is also preferred to supply the compressed air into that of any adjacent blow molding operation. The air cylinder and its piston are conventional commercially available items.

Each air cylinder is secured by suitable means such as bolts to a mounting block 320 which in turn is secured by welding or bolts to plate 56. The piston plunger 318 extends into one end of a sleeve or rigid coupling 321 to the other end of which coupling is secured a circular steel pad or button 322. Coupling 321 is slidably supported within block 320. Coupling 321 has internal threads 323 that engage corresponding threads on the plunger 318 and on a threaded stem 324 on the button. When air is admitted to the cylinder 316 the plunger 318 extends and the button 322 hits the follower 44 of whatever coupling 12 is presented at station 12E. The plunger continues to drive outwardly until no further motion by the follower 44 is possible by which time the workpiece 2E has been released, the air has been cut off, and the plunger is then allowed to return. The cylinder can be either single or preferably, double acting but if the former a spring return or something equivilent must be provided.

The mounting blocks 320 are secured by suitable means such as bolts to the horizontal plate 56.

What is claimed is:

1. A machine for carrying a workpiece between a workpiece loading station and a workpiece unloading station and return comprising the combination of:
   a. a machine base;
   b. a coupling capable of engaging and disengaging a shaped portion of a workpiece responsive to being moved to and from respectively said workpiece loading station and said workpiece unloading station;
   c. conveyor means movably mounted relative to said machine base for supporting said coupling for repeated movement along respective first and second paths to and away from said respective stations for loading and unloading;
   d. means for operating said coupling to engage and disengage said workpiece responsive to said coupling arriving at said loading station and at said unloading station, respectively;
   e. means for feeding workpieces one at a time into said coupling when said coupling arrives at said loading station;
   f. conveyor drive means that alternately and periodically interrupts movement of said conveyor between said stations to alternately stop said conveyor with said coupling arrived at said means for feeding to receive a workpiece therefrom and then to advance said conveyor a predetermined amount; and
   g. timing system means for operating said feeding means to feed a workpiece into said coupling when said conveyor movement is interrupted connected between said means for feeding and said conveyor drive means.

2. A machine according to claim 1, wherein:
   a. said conveyor means includes bearing means for revolvably supporting said coupling therefrom whereby said coupling may be revolved about an axis through the bearing.

3. A machine according to claim 2, wherein said conveyor further comprises:
   a. a carrier body on which said bearing means is supported;
   b. a track on said machine base extending between said stations; and
   c. roller means supporting said carrier on said track.

4. A machine according to claim 1, further comprising workpiece unloading means at said workpiece unloading station for ejecting a workpiece therefrom by engaging a portion of said coupling during movement thereof at substantially the time when said coupling is completing its journey to said unloading station and beginning a return to said engaging station.

5. A machine according to claim 1, further comprising means for continuously rotating said coupling while being conveyed from said workpiece loading station to said workpiece unloading station, whereby said workpiece is rotated while conveyor movement is interrupted.

6. A machine for carrying a workpiece between a workpiece loading station and a workpiece unloading station and return comprising the combination of:
   a. a machine base;
   b. a coupling capable of engaging and disengaging a shaped portion of a workpiece responsive to being moved to and from respectively said workpiece loading station and said workpiece unloading station;
   c. conveyor means movably mounted relative to said machine base for supporting said coupling for repeated movement along respective first and second paths to and away from said respective stations for loading and unloading, said conveyor means including bearing means for revolvably supporting said coupling therefrom whereby said coupling may be revolved about an axis through the bearing; a carrier body on which said bearing means is supported; a track on said machine base extending between said stations; roller means supporting said carrier on said track; a chain led between two sprockets in parallel with said track; and means connecting said carrier to said chain whereby driving one of said sprockets moves the carrier;
   d. means for operating said coupling to engage and disengage said workpiece responsive to said coupling arriving at said loading station and at said unloading station, respectively;
   e. means for feeding workpieces one at a time into said coupling when said coupling arrives at said loading station; and
   f. conveyor drive means that alternately and periodically interrupts movement of said conveyor means between said stations to alternately stop said conveyor with said coupling arrived at said means for feeding to receive a workpiece therefrom and then to advance said conveyor a predetermined amount.

7. A machine for carrying a plurality of workpieces each having a longitudinal axis between a workpiece loading station and a workpiece unloading station and return comprising the combination of:
   a. a machine base;
   b. a plurality of couplings arranged in rank and file manner each capable of engaging and disengaging a shaped portion of a workpiece responsive to being moved to said workpiece loading station and said workpiece unloading station, respectively;
   c. conveyor means movably mounted relative to said machine base for supporting said plurality of couplings in said rank and file manner for repeated movement along respective first and second paths to and away from said respective stations for loading and unloading;
   d. respective loading and unloading means for operating a rank of said couplings to engage and disengage workpieces therefrom responsive to such rank of said couplings arriving at said loading station and unloading station, respectively;
   e. means for feeding a workpiece along its axis into each said coupling in such rank in unison with similarly feeding a workpiece into each of the other couplings in such rank when such rank arrives at said loading station and to repeat such feeding when the succeeding coupling in each file has arrived at said loading station;
   f. means for engaging and rotating continuously about the respective said workpiece axes all of those couplings in a portion of successive ranks between said loading and unloading stations while said couplings are being conveyed by periodic advancement between said loading and unloading stations; and
   g. conveyor drive means that alternately and periodically interrupts movement of said conveyor between said stations to alternately stop said conveyor with each said coupling arriving in turn at said means for feeding to receive a workpiece therefrom in unison with other couplings in its rank and then to advance said conveyor a predetermined amount.

8. A machine for carrying a workpiece having a longitudinal axis between a workpiece loading station and a workpiece unloading station and return comprising the combination of:
   a. a machine base;
   b. a coupling capable of engaging and disengaging a shaped portion of a workpiece responsive to being moved to and from respectively said workpiece loading station and said workpiece unloading station;
   c. conveyor means movably mounted relative to said machine base for supporting said coupling for repeated movement along respective first and second paths to and away from said respective stations for loading and unloading;
   d. means for operating said coupling to engage and disengage said workpiece responsive to said coupling arriving, respectively, at said loading staton and at said unloading station, respectively;
   e. means for feeding workpieces one at a time along its said axis into said coupling when said coupling arrives at said loading station; and
   f. conveyor drive means that alternately and periodically interrupts movement of said conveyor between said stations to alternately stop said conveyor with said coupling arrived at said means for feeding to receive a workpiece therefrom and then to advance said conveyor a predetermined amount; and wherein g. said coupling comprises a support member having an upper stem portion for securing to said conveyor means, a cup-shaped lower support portion having a wall surrounding a chamber, said wall having an internal detent release surface on its inside lower edge, an internal detent engaging surface above said skirt, an open end adjacent said skirt and a closed end opposite said open end and supporting said upper stem portion;

h. a detent carrier movably mounted in the upper end of the chamber to be axially movable toward and away from said skirt, actuable for movement by means outside of said wall and having a workpiece receiving space with an open end adjacent said skirt and a closed upper end;

i. detent means supported by said detent carrier and radially movable in and out from the central part of said chamber responsive to respective axial movement of the carrier between said detent engaging surface and said detent release surface;

j. whereby moving said carrier axially relative to said support member toward said skirt moves the detent means to a position disengageably from any workpiece if one be present and moving the carrier in the opposite direction moves the detent to a position engageable with a workpiece if one be present.

9. A machine according to claim 8, whereby said coupling further comprises:
a seat movably mounted in the upper end of said detent carrier.

10. A machine according to claim 8, wherein said support upper portion has a shaft-like stem and said conveyor means includes bearing means for revolvably supporting said stem section whereby the coupling may be rotated relative to the conveyor.

11. A machine according to claim 10, wherein said stem is hollow, said carrier has a follower extending from the closed end of said carrier and passsing through and being slidably supported in said stem.

12. A machine according to claim 8, wherein a follower extends from said detent carrier closed end and passes through that end of the support opposite said skirt.

13. A machine according to claim 12, further comprising first resilient biasing means urging said stem away from said skirt and within the shield.

14. A machine according to claim 9, wherein said coupling has an ejection assisting means that has a resilient biasing means that urges said seat in a direction away from said housing upper end.

15. A machine according to claim 14, wherein said coupling has another resilient biasing means that urges said carrier to within said support with a force greater than the ejection assisting biasing means urges said seat apart from said housing.

16. A machine according to claim 8, wherein said carrier has a plurality of tapered holes having their least dimension innermost diverging outwardly each at a location such that the holes move the detent means from engagement with the detent release surface to engagement with the detent engaging surface and vice versa, and said detent means comprises a plurality of balls each within one of said tapered holes and having a diameter too large to allow the ball to pass through the least dimension thereof but small enough to permit the ball to protrude substantially interiorly of the housing in response to movement of the housing holes to the detent engaging surface and to retract to where the ball does not protrude substantially thereunto in response to movement of the housing holes to the detent release surface.

17. A method of loading a workpiece into a coupling, conveying it along a path to an unloading station and there releasing it comprising the steps of:

a. providing a coupling for holding said workpiece which comprises a generally cup-shaped support member revolvably mounted on a linearly movable conveyor means, a cup-shaped carrier member slidably mounted for axial movement within said support member and detent means carried by said carrier and operable to move radially responsive to axial motions between said carrier and support members;

b. moving said coupling to and arresting motion at a loading station;

c. feeding a workpiece axially thereof into said coupling;

d. moving said detents radially inward to grasp said workpiece responsive to the aforesaid axial motion;

e. conveying said coupling and workpiece by intermittent periodic increments of advancement toward said unloading station; and f. releasing said workpiece by causing said detents to move radially away from said workpiece responsive to movement to said unloading station.

18. The combination of the method of claim 17 and step of continuously rotating said coupling during a major portion of the time the coupling with workpiece therein is being intermittently advanced toward said unloading station.

19. A method according to claim 18, wherein the providing step includes furnishing a plurality of equally spaced couplings in an array of couplings arranged in rank and file manner whereby a plurlaity of said couplings may be simultaneously loaded and unloaded.

20. A method according to claim 17, wherein a plurality of equally spaced couplings are provided in an array of couplings arranged in rank and file manner whereby a plurality of said couplings may be simultaneously loaded and unloaded.

21. A method according to claim 18, further including providing on said coupling a sufficiently long skirt to shield the head of the workpiece.

22. A method according to claim 18, with the steps of engaging said coupling with a means for continuously rotating said coupling that is initially resiliently urged into rotating driving contact with said coupling.

* * * * *

Disclaimer

3,958,685.—*David Ian McDonald; George William Sederberg; Gary David Stephenson* and *James Gordon Wiatt*, Cincinnati, Ohio. COUPLING FOR HANDLING WORKPIECE, CONVEYOR COMBINED THEREWITH, AND METHOD. Patent dated May 25, 1976. Disclaimer filed Jan. 12, 1981, by the assignee, *Cincinnati Milacron Inc.*

Hereby enters this disclaimer to claims 1, 2, 3 and 4 of said patent.
[*Official Gazette May 12, 1981.*]